United States Patent
Oemcke et al.

(10) Patent No.: US 6,551,388 B1
(45) Date of Patent: Apr. 22, 2003

(54) VOLUME COMPENSATOR ASSEMBLY FOR VAPOR CANISTER

(75) Inventors: Jonathan M. Oemcke, Rochester Hills, MI (US); Andrew J. Stanton, Palmyra, NY (US); Duane A. Swanson, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/059,025

(22) Filed: Jan. 28, 2002

(51) Int. Cl.[7] ........................... B01D 53/04; F02M 33/02
(52) U.S. Cl. ......................................... 96/149; 123/519
(58) Field of Search ................................. 123/518, 519, 123/520, 521; 96/108, 121, 122, 130, 147, 149, 152; 55/385.3, 513; 210/352

(56) References Cited

U.S. PATENT DOCUMENTS

| | | | |
|---|---|---|---|
| 2,894,530 A | | 7/1959 | Stevens et al. |
| 3,407,936 A | * | 10/1968 | Balogh ........................ 210/282 |
| 4,192,751 A | | 3/1980 | Henton et al. |
| 4,877,001 A | * | 10/1989 | Kenealy et al. ............. 123/519 |
| 4,894,072 A | | 1/1990 | Turner et al. |
| 5,098,453 A | * | 3/1992 | Turner et al. ................. 96/149 |
| 5,239,858 A | | 8/1993 | Rogers et al. |
| 5,245,973 A | | 9/1993 | Otsuka et al. |
| 5,286,282 A | | 2/1994 | Goodell et al. |
| 5,337,721 A | | 8/1994 | Kazsuya et al. |
| 5,398,660 A | | 3/1995 | Koyama et al. |
| 5,620,507 A | * | 4/1997 | Oborne et al. ................. 96/149 |
| 5,632,251 A | | 5/1997 | Ishikawa |
| 5,645,036 A | | 7/1997 | Matsumoto et al. |
| 5,669,361 A | | 9/1997 | Weissinger et al. |
| 5,671,718 A | | 9/1997 | Curran et al. |
| 5,715,799 A | | 2/1998 | Blomquist et al. |
| 5,718,209 A | | 2/1998 | Scardino et al. |
| 5,743,943 A | | 4/1998 | Maeda et al. |
| 6,067,967 A | | 5/2000 | Kidokoro et al. |

* cited by examiner

Primary Examiner—David A. Simmons
Assistant Examiner—Frank M. Lawrence
(74) Attorney, Agent, or Firm—Vincent A. Lichosz

(57) ABSTRACT

A volume compensator assembly for a vapor canister includes a partition adapted to be disposed in an interior chamber of the vapor canister and having a single opening extending therethrough. The volume compensator assembly also includes a grid pattern disposed on the partition about the opening to guide airflow to the opening. The volume compensator assembly further includes a spring connected to the partition and contacting the vapor canister to move the partition for compensation of a volume of a bed of vapor adsorbing material in the vapor canister.

20 Claims, 3 Drawing Sheets

VOLUME COMPENSATOR ASSEMBLY FOR VAPOR CANISTER

TECHNICAL FIELD

The present invention relates generally to vapor canisters for vehicles and, more particularly, to a volume compensator assembly for a vapor canister of an evaporative emission system in a vehicle.

BACKGROUND OF THE INVENTION

It is known to provide a fuel tank in a vehicle to hold fuel to be used by an engine of the vehicle. It is also known to provide a vapor recovery and storage or evaporative emission system for the vehicle to reduce evaporative emissions of the fuel from the vehicle. Typically, the evaporate emission system includes a vapor canister remotely mounted such as in an engine compartment of the vehicle and operatively connected by separate external valves and lines to the fuel tank. However, the evaporative emission system is prone to permeation and bleed emission losses, has limited vapor storage capacity, and limited vapor flow rate acceptance.

New low emission vehicle requirements greatly reduce the amount of evaporative emissions allowed from the vehicle. The low levels now required effectively move the emissions from the "breakthrough" level—where the canister's carbon capacity was fully utilized—to the "bleed" level. These bleed emissions are hydrocarbon vapors that escape to atmosphere through migration of the canister's hydrocarbon heel.

Current evaporative emissions canisters include volume compensation for the activated carbon contained within the canister. This compensation is necessary to provide an adequate carbon pack during the canister life expectancy. Without adequate pack, the carbon particles erode against each other or make flow paths for hydrocarbons to escape without being adsorbed. Erosion or open flow paths within the carbon bed lead to emission failures or vehicle diagnostic trouble codes. There are two main factors that contribute to the need for volume compensation of the carbon bed. First, over its life, the canister is exposed to vibration, impacts, and other motion that causes the carbon bed to endure some surface erosion and shifting of carbon particles to a tighter pack. Secondly, exposure to wide ranges of temperature cause the molded plastic canister body to expand and contract, adjusting the internal area where the carbon bed is contained. Adequate compensation allows the carbon bed to remain intact and capable of performing without deterioration.

Volume compensators have evolved along with canisters over the past twenty-five years. The first canisters, which were relatively small and molded with rigid plastic, did not incorporate volume compensators. As canisters began to increase in size and utilized a less rigid but higher impact resistant shell materials, volume compensation was needed. The initial volume compensators were an assembly of two molded trays having a plurality of openings therethrough that captured two springs. The volume compensator is typically the last component assembled into the canister prior to welding the bottom cover onto the canister and sealing the carbon bed inside. This design was adequate, but limited by high cost, many assembled pieces, and a large packaging space. The second generation of volume compensation changed to a stamped metal plate having a plurality of openings therethrough with an attached spring. The complexity, cost, and packaging issues were dramatically improved. The second generation volume compensator changed the internals of the canister and enhanced performance. Two distinct chambers were created internally, eliminating the ability to use a single volume compensator for the canister, thus requiring a volume compensator for each chamber of carbon. This chambering forced the flow of air through the canister (filling, purging) to travel through the volume compensator plates. The volume compensators had a plurality of openings therethrough for maximum flow area to prevent any increase in flow restriction through the canister.

With these volume compensators, as hydrocarbons from the fuel tank are vented to the vapor canister, they are adsorbed into the carbon bed and prevented from exiting to the environment. However, as the vapor canister is subjected to time and diurnal temperature variation, the hydrocarbons in the carbon bed begin to migrate towards the air-inlet tube of the vapor canister. The bleed emissions are not sufficiently captured as a result of these volume compensators, producing an unacceptable performance of the vapor canister.

Therefore, it is desirable to provide a volume compensator for a vapor canister for compensation of carbon volume. It is also desirable to provide a single-hole volume compensator to improve diurnal bleed emissions performance of a vapor canister. It is further desirable to provide a volume compensator in a vapor canister that minimizes flow restriction and is easier to package in a vapor canister.

SUMMARY OF THE INVENTION

It is, therefore, one object of the present invention to provide a new volume compensator for a vapor canister in a vehicle.

It is another object of the present invention to provide a single hole volume compensator for a vapor canister in a vehicle.

It is yet another object of the present invention to provide a volume compensator for a vapor canister that aids in the diurnal emissions performance of the vapor canister while minimizing flow restriction.

To achieve the foregoing objects, the present invention is a volume compensator assembly for a vapor canister including a partition adapted to be disposed in an interior chamber of the vapor canister and having a single opening extending therethrough. The volume compensator assembly also includes a grid pattern disposed on the partition about the opening to guide airflow to the opening. The volume compensator assembly further includes a spring connected to the partition and contacting the vapor canister to move the partition for compensation of a volume of a bed of vapor adsorbing material in the vapor canister.

One advantage of the present invention is that a volume compensator assembly is provided for volume compensation of a carbon bed in a vapor canister. Another advantage of the present invention is that the volume compensator assembly has a single opening that aids in the diurnal emissions performance of the canister by hindering the migration of the hydrocarbons in the carbon bed of the vapor canister. Yet another advantage of the present invention is that the volume compensator assembly has a single opening and grid pattern that provides a low flow restriction for the vapor canister that does not affect the fuel system during refueling and canister purging. Yet another advantage of the present invention is that the volume compensator assembly has a single opening and grid pattern that minimizes overall thickness of the volume compensator to package easily in the vapor canister without impacting overall vapor canister size. Still another advantage of the present invention is that the volume compensator assembly has a single opening and grid pattern that improves diurnal bleed emissions performance, minimizes flow restriction, and has a low profile for easy packaging and assembly. A further advantage of the present invention is that the volume compensator assembly has a single opening that does not impact cost.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
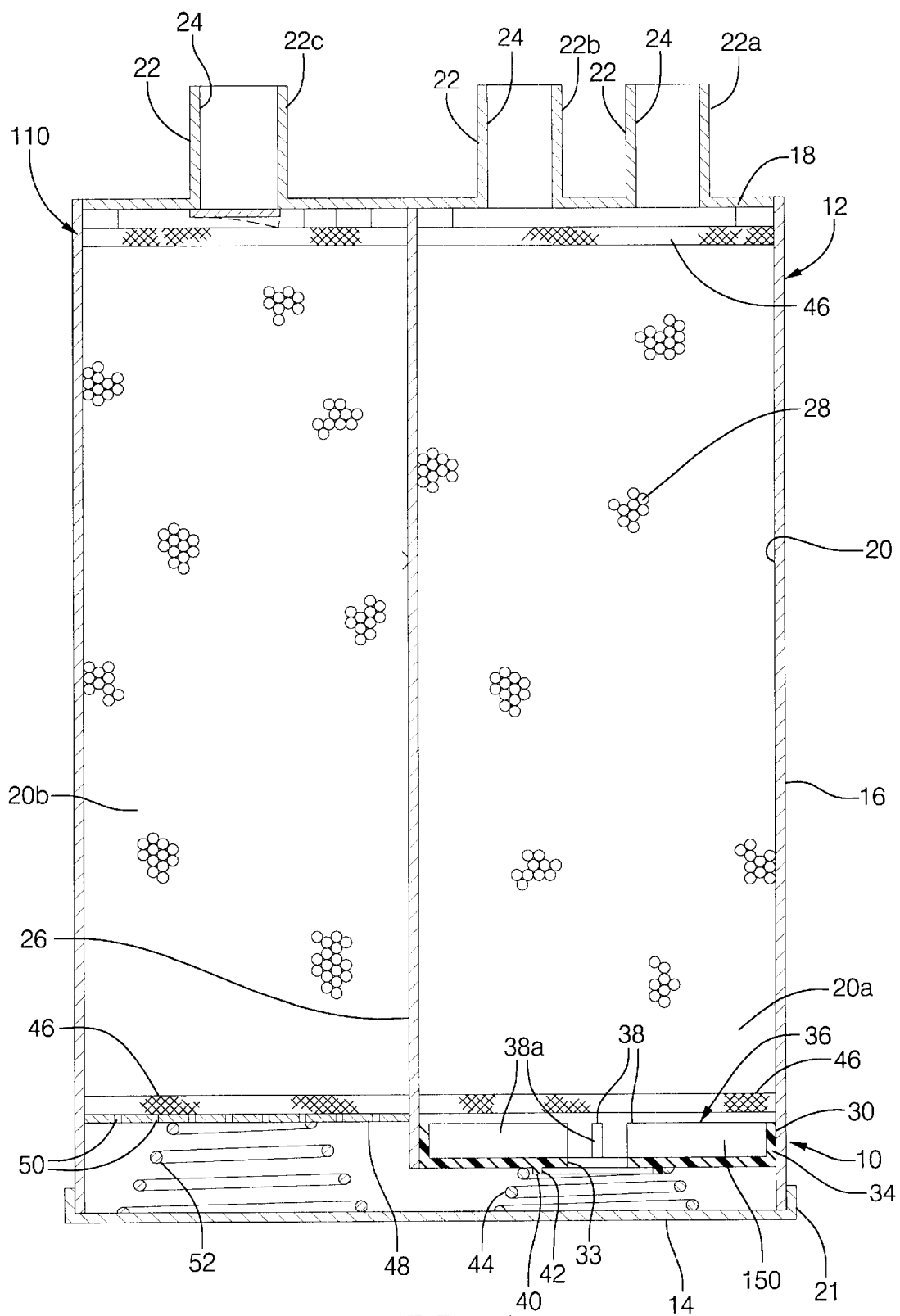
FIG. 1 is a fragmentary elevational view of a volume compensator assembly, according to the present invention, illustrated in operational relationship with a vapor canister.
Figure 2:
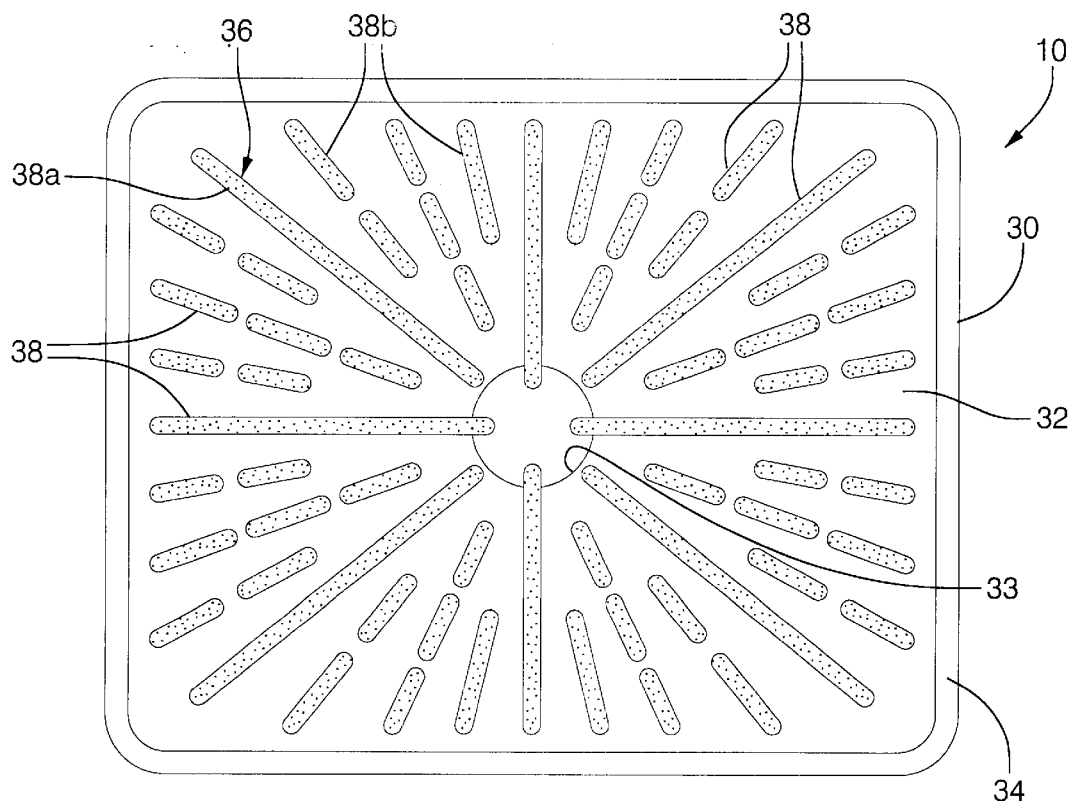
FIG. 2 is a plan view of the volume compensator assembly of FIG. 1.
Figure 3:
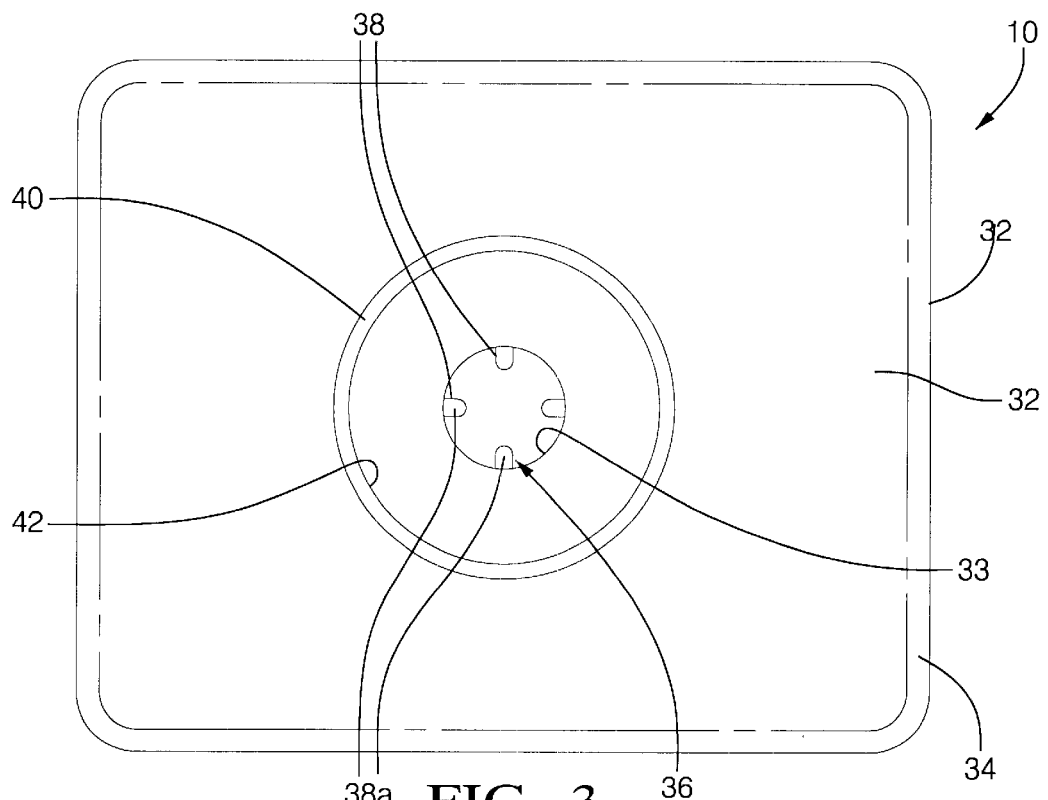
FIG. 3 is a bottom view of the volume compensator assembly of FIG. 1.
Figure 4:
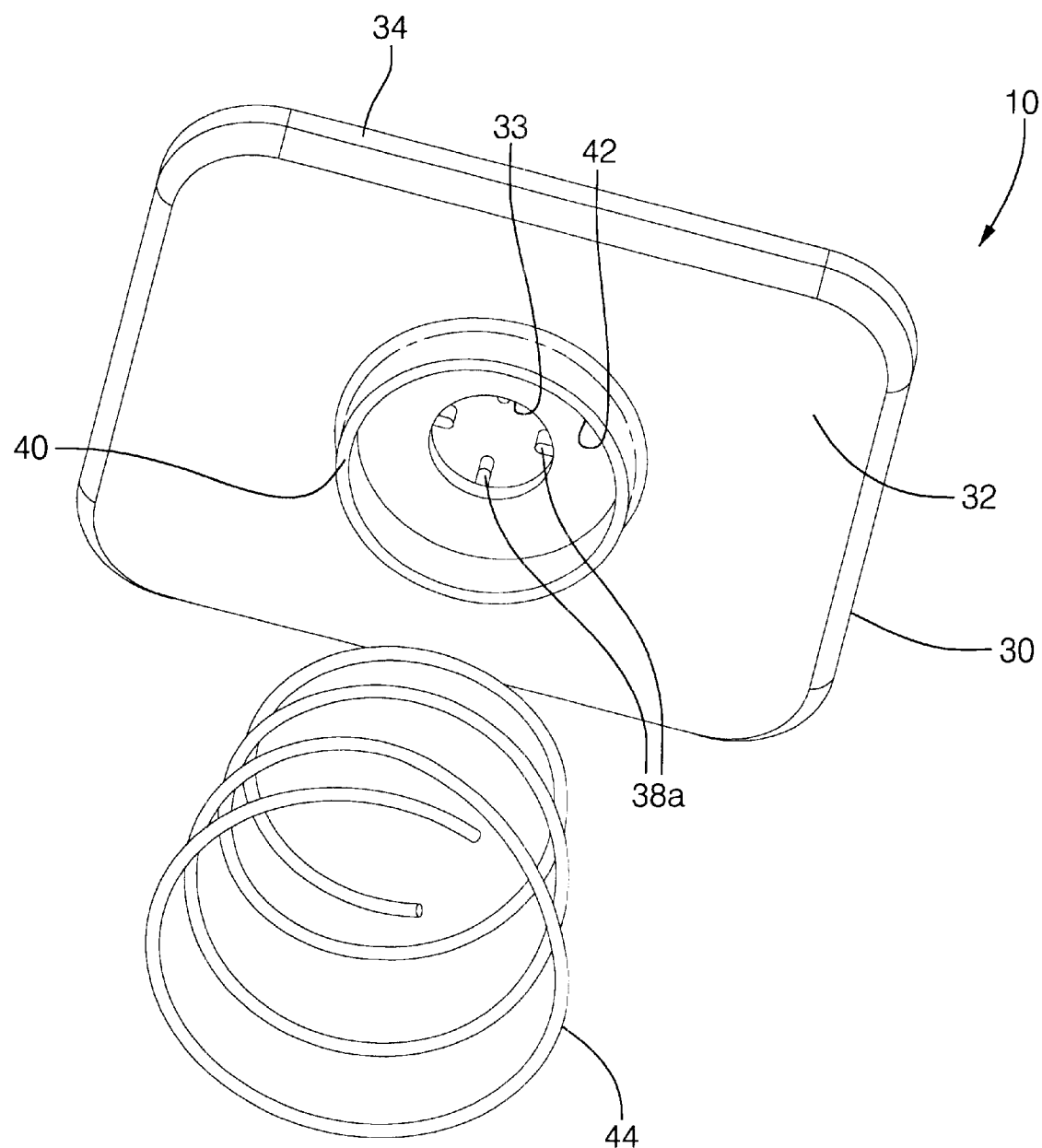
FIG. 4 is an exploded perspective view of the volume compensator assembly of FIG. 1.

Referring to the drawings and in particular FIGS. 1 through 4, one embodiment of a volume compensator assembly 10, according to the present invention, is shown for a vapor canister, generally indicated at 12, of an evaporative emission system (not shown) in a vehicle (not shown). The vapor canister 12 is used to store or hold fuel vapor. In this embodiment, the vapor canister 12 is generally rectangular in shape and has a generally rectangular cross-sectional shape. The vapor canister 12 includes a base or bottom wall 14 and a side wall 16 around a periphery of the bottom wall 14 and extending generally perpendicular thereto. The vapor canister 12 also includes a top wall 18 extending generally perpendicular to the side wall 16 to form an interior chamber 20. The bottom wall 14 may have a flange 21 extending perpendicularly thereto and overlapping a portion of the side wall 16. The vapor canister 12 further includes at least one, preferably a plurality of connectors or tubes 22 extending axially outwardly and generally perpendicular to the top wall 18. The tubes 22 form a first tube 22a for connection to a purge line (not shown), a second tube 22b for connection to a fuel tank (not shown), and a third tube 22c for connection to or being open to atmosphere. Each of the tubes 22a,22b,22c have a passageway 24 communicating with the interior chamber 20. The vapor canister 12 has an interior wall 26 extending axially between the top wall 18 and bottom wall 14 to divide the interior chamber 20 into a first chamber 20a and a second chamber 20b for a function to be described. The vapor canister 12 includes a bed 28 of a vapor absorbing material such as activated carbon material for adsorbing fuel vapor. The vapor canister 12 is made of a rigid material, preferably a plastic material. It should be appreciated that the vapor canister 12 could be made of a metal material such as steel.

In one embodiment, the volume compensator assembly 10 is disposed at the end of the bed 28 of the first chamber 20a. The volume compensator assembly 10 includes a plate or partition 30 having a generally rectangular shape. The partition 30 has a base wall 32 being generally planar with a single opening 33 extending axially therethrough to allow flow across the partition 30. The partition 30 also has a side wall 34 surrounding a periphery of the base wall 32 and extending generally perpendicular thereto. The partition 30 is made of a rigid material such as plastic. The partition 30 is a monolithic structure being integral, unitary, and one piece. It should be appreciated that the partition 30 is orientated horizontally to support the carbon material in the bed 28 and extends radially across the first chamber 20a.

The volume compensator assembly 10 also includes a grid pattern, generally indicated at 36, disposed about the opening 33 to guide airflow into the opening 33. The grid pattern 36 includes at least one, preferably a plurality of ribs 38 extending outwardly on both sides of the base wall 32. The ribs 38 include a plurality of primary ribs 38a and secondary ribs 38b extending radially outwardly and spaced radially and circumferentially about the opening 33. The primary ribs 38a have a length longer or greater than a length of the secondary ribs 38b. The ribs 38 are made of a rigid material such as plastic. The ribs 38 and partition 30 are a monolithic structure being integral, unitary, and one piece.

The volume compensator assembly 10 further includes a flange 40 disposed on a bottom of the partition 30 about the opening 33. The flange 40 extends axially from the base wall 32 and annularly about the opening 33. The flange 40 is generally circular in shape has one end connected to the base wall 32 to form a cavity 42. The flange 40 is made of a rigid material such as plastic. The flange 40 and partition 30 are a monolithic structure being integral, unitary, and one piece.

The volume compensator assembly 10 includes a spring 44 to bias the partition 30 toward the carbon bed 28. The spring 44 is of a coil type and is deflectable in both directions relative to the partition 30 to compensate for the volume or size of the bed 28. The spring 44 is disposed about the flange 40 between the base wall 32 and the bottom wall 14. It should be appreciated that the spring 44 is conventional and known in the art.

The vapor canister 12 may include at least one, preferably a plurality of screens 46 at the ends of the bed 28 to support the carbon material. In one embodiment, one screen 46 is disposed on each side of the bed 28 at a top thereof and another screen 46 is disposed on each side thereof at a bottom of the bed 28. The screen 46 is generally rectangular in shape. The screen 46 is made of a rigid material such as foam or needled polyester. The screen 46 is a monolithic structure being integral, unitary, and one-piece. It should be appreciated that additional screens 46 may be placed at other locations in the vapor canister 12. It should also be appreciated that one screen 46 is disposed between a bottom of the bed 28 and the volume compensator assembly 10 to prevent particles of the vapor adsorbing material such as carbon from getting through the opening 33 in the partition 30 or filling the grid pattern 36.

The vapor canister 12 may include a volume compensator plate 48 at the bottom of the bed 28 in the second chamber 20b. The volume compensator plate 48 includes a plurality of openings 50 extending therethrough. The volume compensator plate 48 is generally rectangular in shape. The volume compensator plate 48 is made of a rigid material such as metal or plastic. The volume compensator plate 48 is a monolithic structure being integral, unitary, and one-piece. The vapor canister 12 may include a spring 52 to bias the volume compensator plate 48 toward the carbon bed 28. The spring 52 is of a coil type and is deflectable in both directions relative to the volume compensator plate 48 to compensate for the volume or size of the bed 28. The spring 52 is disposed between the volume compensator plate 48 and the bottom wall 14. It should be appreciated that the spring 52 is conventional and known in the art. It should also be appreciated that one screen 46 is disposed between a bottom of the bed 28 and the volume compensator 48 to prevent particles of the vapor adsorbing material such as carbon from getting through the openings 50.

In operation, hydrocarbons or fuel vapors from a fuel tank (not shown) enter the vapor canister 12 through the tube 22b and are adsorbed by the vapor adsorbing material in the bed 28 and prevented from exiting to the environment. Filtered air enters the vapor canister 12 through the tube 22c to flush the canister bed 28. In high flow conditions, such as refueling events and vacuum purging of the vapor canister 12, the single opening 33 of the volume compensator assembly 10 allows the minimal restriction to be maintained. The grid pattern 36 allows airflow to exit the first chamber 20a and funnel through the single opening 33 without a noticeable restriction increase. It should be appreciated that if a grid pattern 37 were not included in the volume compensator assembly 10, the restriction would be tremendous and push the restriction of the entire canister well beyond its specified maximum value. It should further be appreciated that the purging of vapor fuel is conventional and known in the art.

As the vapor canister 12 is subjected to time and diurnal temperature variation, the hydrocarbons in the bed 28 begin to migrate towards the air-inlet tube 22c of the vapor canister 12. The volume compensator assembly 10, located at the end of the first chamber 20a creates a more tortuous path for the hydrocarbons to travel, in turn, reducing the amount of hydrocarbon that can move from the first chamber 20a to the second chamber 20b. The cross-sectional area that the hydrocarbons must travel through is reduced approximately twenty to thirty times. It should be appreciated that holding the hydrocarbons in the first chamber 20a longer improves the efficiency of the vapor canister 12 at preventing hydrocarbon losses to the environment, by keeping the second chamber 20b of the vapor canister 12 clean longer into the diurnal.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A volume compensator assembly for a vapor canister comprising:
   a partition adapted to be disposed in an interior chamber of the vapor canister and having a single opening extending therethrough;
   a grid pattern disposed on said partition about said opening to guide airflow to said opening; and
   a spring connected to said partition and contacting the vapor canister to move said partition for compensation of a volume of a bed of vapor adsorbing material in the vapor canister.

2. A volume compensator assembly as set forth in claim 1 wherein said partition has a base wall and a side wall extending generally perpendicular to said base wall, said base wall including said opening.

3. A volume compensator assembly as set forth in claim 1 wherein said grid pattern includes a plurality of ribs disposed on said partition.

4. A volume compensator assembly as set forth in claim 3 wherein said ribs extend radially from said partition and are spaced circumferentially about said opening.

5. A volume compensator assembly as set forth in claim 3 wherein said ribs comprise a plurality of primary ribs and a plurality of secondary ribs, said primary ribs having a length longer than a length of said secondary ribs.

6. A volume compensator assembly as set forth in claim 1 wherein said partition is generally rectangular in shape.

7. A volume compensator assembly as set forth in claim 1 including a flange extending axially from said partition and disposed about said opening.

8. A volume compensator assembly as set forth in claim 7 wherein said flange is generally circular in shape.

9. A volume compensator assembly as set forth in claim 7 wherein said flange is connected to a bottom of said partition to form a cavity therein.

10. A volume compensator assembly as set forth in claim 7 wherein said spring is disposed about said flange between said partition and the vapor canister.

11. A volume compensator assembly as set forth in claim 1 wherein said spring is of a coil type.

12. A vapor canister assembly for a vehicle comprising:
   a vapor canister having an interior chamber and a bed of vapor adsorbing material disposed in said interior chamber;
   a partition disposed in said interior chamber of said vapor canister and having a single opening extending therethrough;
   a grid pattern disposed on said partition about said opening to guide airflow to said opening; and
   a spring connected to said partition and contacting said vapor canister to move said partition for compensation of a volume of said bed in said vapor canister.

13. A vapor canister assembly as set forth in claim 12 wherein said partition has a base wall and a side wall extending generally perpendicular to said base wall, said base wall including said opening.

14. A vapor canister assembly as set forth in claim 12 wherein said grid pattern includes a plurality of ribs disposed on said partition.

15. A vapor canister assembly as set forth in claim 14 wherein said ribs extend radially from said partition and are spaced circumferentially about said opening.

16. A vapor canister assembly as set forth in claim 14 wherein said ribs comprise a plurality of primary ribs and a plurality of secondary ribs, said primary ribs having a length longer than a length of said secondary ribs.

17. A vapor canister assembly as set forth in claim 12 including a flange extending axially from said partition and disposed about said opening.

18. A vapor canister assembly as set forth in claim 17 wherein said flange is connected to a bottom of said partition to form a cavity therein.

19. A vapor canister assembly as set forth in claim 18 wherein said spring is disposed about said flange between said partition and the vapor canister.

20. A vapor canister assembly for a vehicle comprising:
   a vapor canister having an interior chamber and a bed of vapor adsorbing material disposed in said interior chamber;
   a partition disposed in said interior chamber of said vapor canister and having a base wall, a single opening extending through said base wall, and a plurality of ribs extending outwardly from said base wall and spaced about said opening; and
   a spring connected to said partition and contacting said vapor canister to move said partition for compensation of a volume of said bed in said vapor canister.

* * * * *